(12) United States Patent
Lin

(10) Patent No.: US 7,567,877 B2
(45) Date of Patent: Jul. 28, 2009

(54) SYSTEM AND METHOD FOR COMPUTING THE FREQUENCY OF A LOW FREQUENCY WAVE

(75) Inventor: Yu-Hsu Lin, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 166 days.

(21) Appl. No.: 11/308,991

(22) Filed: Jun. 5, 2006

(65) Prior Publication Data

US 2007/0088512 A1 Apr. 19, 2007

(30) Foreign Application Priority Data

Sep. 16, 2005 (CN) .......................... 2005 1 0037344

(51) Int. Cl.
 *G01M 19/00* (2006.01)
(52) U.S. Cl. .............................. 702/75; 702/56; 702/66; 324/76.19; 324/76.39; 324/76.41
(58) Field of Classification Search .................... 702/75, 702/66, 103, 104, 14, 56, 76, 79; 73/592; 324/76.19, 76.39, 76.41
 See application file for complete search history.

(56) References Cited

U.S. PATENT DOCUMENTS

| | | | | |
|---|---|---|---|---|
| 4,495,500 A | * | 1/1985 | Vickers | 342/59 |
| 5,557,969 A | * | 9/1996 | Jordan | 73/592 |
| 2003/0213298 A1 | | 11/2003 | Nyce | |

\* cited by examiner

*Primary Examiner*—Drew A Dunn
*Assistant Examiner*—Hien X Vo
(74) *Attorney, Agent, or Firm*—Winston Hsu

(57) ABSTRACT

The present invention provides a system for computing the frequency of a low frequency wave. The system includes: a wave producer (3) configured for sending out a first wave with a high frequency; a device (4) configured for sending out a second wave with a low frequency to be computed, the first wave and the second wave interfering with each other thereby producing a third wave; a sensor (2) configured for receiving the third wave; and a computer (1) installed with wave analyzing software and linked with the sensor, and configured for receiving and analyzing the third wave to compute the frequency of the second wave.

12 Claims, 6 Drawing Sheets

SYSTEM AND METHOD FOR COMPUTING THE FREQUENCY OF A LOW FREQUENCY WAVE

FIELD OF THE INVENTION

The present invention generally relates to systems and methods for computing the frequency of a wave, and more particularly to a system and method for computing the frequency of a low frequency wave.

DESCRIPTION OF RELATED ART

A sensor, such as a sound wave sensor or a vibration wave sensor, has a working range; i.e., it has a minimal influence value and a maximal influence value. A sensor cannot capture a wave if the frequency of the wave exceeds the working range of the sensor.

Presently, in order to evaluate the effect of a wave source that sends out a low frequency wave, such as a low frequency noise or a low frequency vibration wave, people often compute the frequency of the low frequency wave sent out from the wave source via a common wave sensor. If the frequency of the low frequency wave exceeds a certain point, a higher precision sensor with broader bandwidth sensing capacity is required to adequately compute the frequency of the low frequency wave. However, a sensor with more precision is much expensive and more complicated for operation.

What is needed, therefore, is a system and method that computes the frequency of a low frequency wave that is inexpensive, yet accurate.

SUMMARY OF INVENTION

A system for computing the frequency of a low frequency wave in accordance with a preferred embodiment includes a wave producer, a device, a sensor and a computer. The computer is installed with wave analyzing software and linked with the sensor. The wave producer controlled by a computer to send out a first wave with a high frequency. The device is configured for sending out a second wave with a low frequency which is to be computed, the first wave and the second wave interfering with each other thereby producing a third wave. The sensor is configured for receiving the third wave. The computer is configured for receiving and analyzing the third wave in order to compute the frequency of the second wave.

A method for computing the frequency of a low frequency wave in accordance with a preferred embodiment includes the steps of: sending out a first wave with a high frequency via a wave producer being controlled by a computer; sending out from a device a second wave with a low frequency which is to be computed; interfering to produce a third wave dependent on the first wave and the second wave; receiving the third wave via a sensor; and analyzing the third wave in order to compute the frequency of the second wave via the computer that is installed with wave analyzing software.

A method for computing the frequency of a low frequency wave in accordance with a preferred embodiment includes the steps of: sending out a first wave with a high frequency; sending out a second wave with a low frequency; interfering to produce a third wave dependent on the first wave and the second wave; receiving the third wave; and computing the frequency of the second wave by analyzing the third wave.

Other advantages and novel features of the present invention will become more apparent from the following detailed description of preferred embodiments when taken in conjunction with the accompanying drawings.

DETAILED DESCRIPTION

Figure 1:
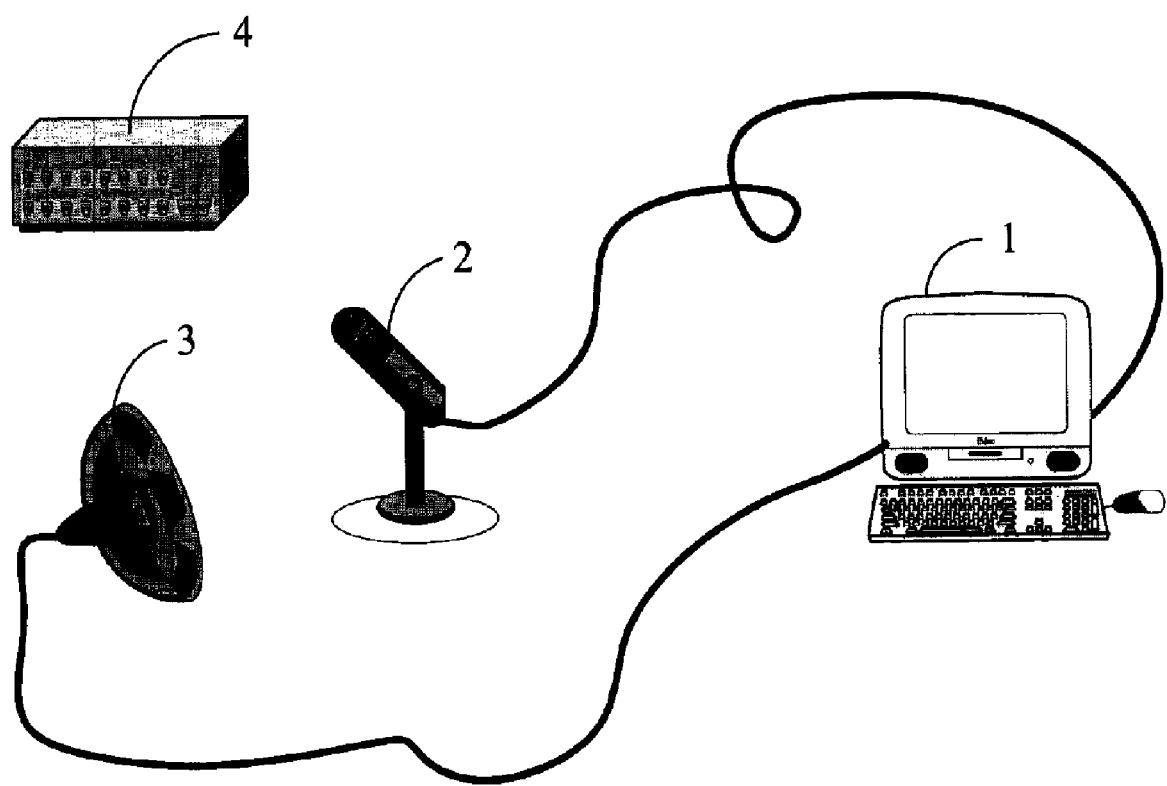
FIG. 1 is a schematic diagram of hardware configuration of a system for computing the frequency of a low frequency sound wave in accordance with a preferred embodiment.

FIG. 1 is a schematic diagram of hardware configuration of a system for computing the frequency of a low frequency sound wave in accordance with a preferred embodiment. The system may include: a computer 1 installed with sound wave analyzing software, a microphone 2 and a speaker 3 both linked with the computer 1, and a sound wave output device 4. Computer 1 is configured for controlling the speaker 3 to send out a fixed-frequency sound wave herein named S2 that is a high frequency sound wave. Sound wave output device 4 is configured for sending out a fixed-frequency sound wave herein named S1 that is a low frequency sound wave. Both speaker 3 and sound wave output device 4 are configured as wave producers. S1 and S2 can be mixed to generate an interference sound wave herein named S12. Microphone 2 works as a sound wave sensor that is configured for recording S12 into the computer 1. The computer 1 is further configured for analyzing S12 via the sound wave analyzing software in order to compute the frequency of S1. In the preferred embodiment, the sound wave analyzing software may be, for example, the "Spectrogram" that is typical and commercially available software that can be used to transform S12 into the form of sine wave spectrum, analyze S12 and compute the frequency of S1.

Figure 2:
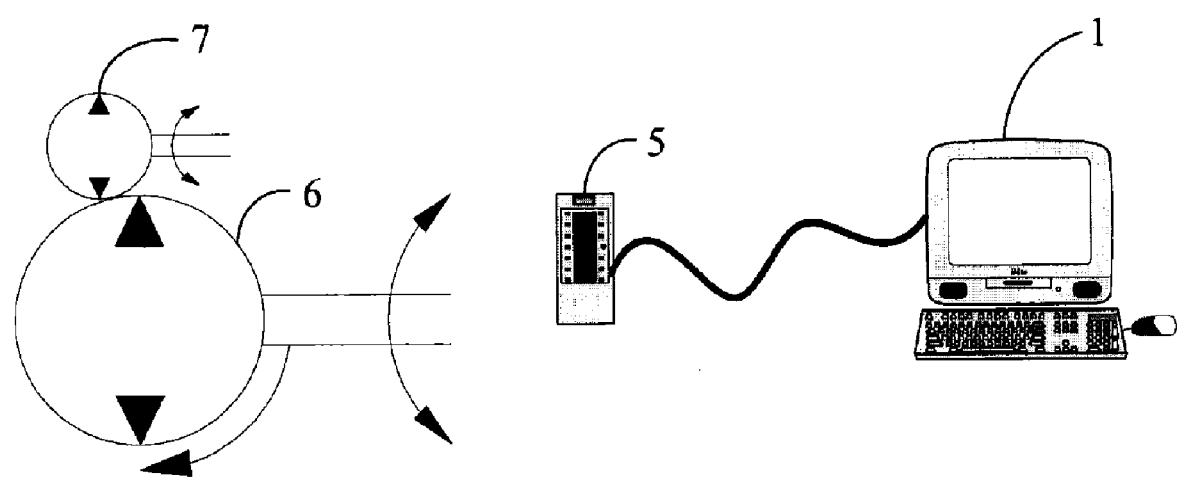
FIG. 2 is a schematic diagram of hardware configuration of a system for computing the frequency of a low frequency vibration wave in accordance with another preferred embodiment.

FIG. 2 is a schematic diagram of hardware configuration of a system for computing the frequency of a low frequency vibration wave in accordance with another preferred embodiment. In the embodiment, the system may include: computer 1 installed with the vibration wave analyzing software, two vibration wave generating devices (for example, a car engine 6 and a toy car engine 7) laid contiguously, a vibration wave sensor 5 connected with computer 1. The two vibration wave generating devices are used for generating a high frequency vibration wave and a low frequency vibration wave correspondingly. The high frequency vibration wave and the low frequency vibration wave are mixed together to generate an interference vibration wave. Vibration wave sensor 5 is used for recording the interference vibration wave into computer 1. Computer 1 is used for analyzing the interference vibration wave via the vibration wave analyzing software.

Figure 3:
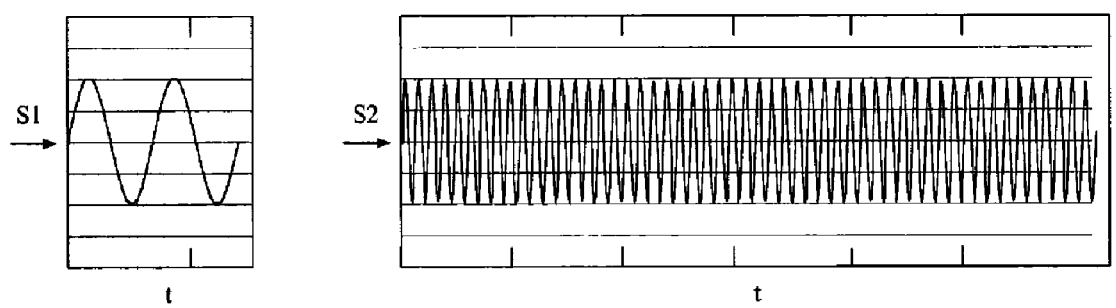
FIG. 3 is a schematic diagram of a typical high frequency wave and a typical low frequency wave.

FIG. 3 is a schematic diagram of the high frequency wave S2 and the low frequency wave S1. A sinusoidal function expression of S1 is shown as follows:

$$\mathrm{Sin}(f_1 \cdot \pi \cdot 2 \cdot t)$$

In the sinusoidal function expression of S1, the variable $f_1$ denotes the frequency of S1, and the variable t denotes a time slice. A sinusoidal function expression of S2 is shown as follows:

$$\mathrm{Sin}(f_2 \cdot \pi \cdot 2 \cdot t)$$

In the sinusoidal function expression of S2, the variable $f_2$ denotes the frequency of S2, and the variable t denotes the time slice. As shown in FIG. 2, S2 has a higher frequency value than S1, the wavelength of S2 is smaller than the wavelength of S1, and the cycle time of S2 is smaller than that of S1.

Figure 4:
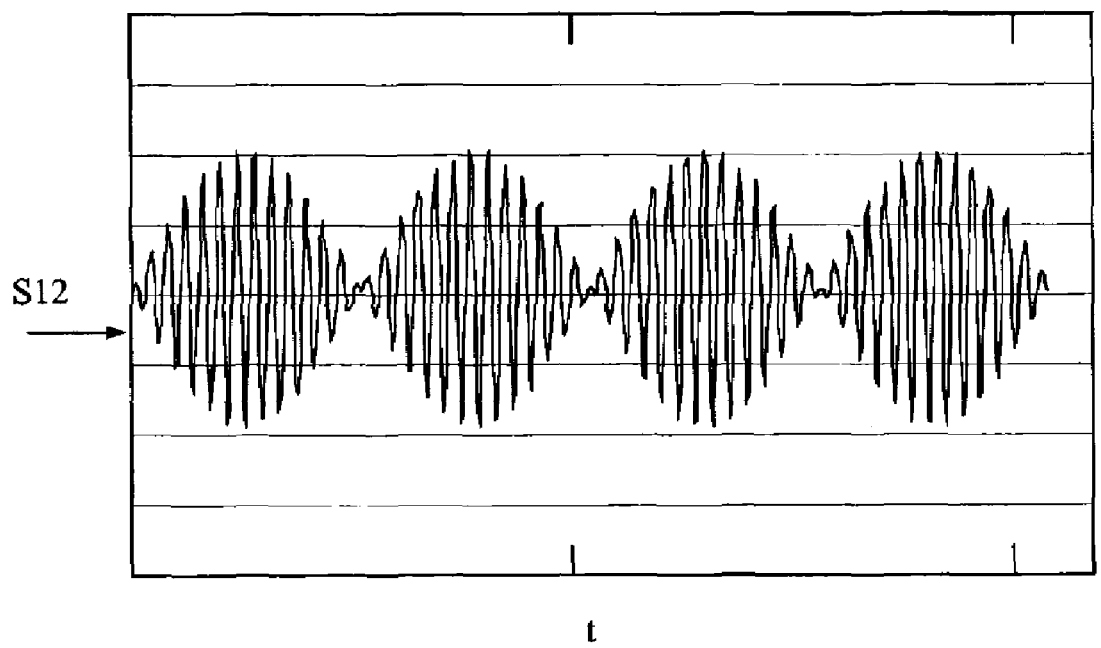
FIG. 4 is a schematic diagram of an interference wave mixed with the high frequency wave and the low frequency wave of FIG. 2.

FIG. 4 is a schematic diagram of the interference sound wave S12 mixed with S1 and S2 of FIG. 2. The function expression of S12 is shown as follows:

$$\frac{1}{2}[\mathrm{Sin}(\omega_1 t + \omega_2 t) + \mathrm{Sin}(\omega_1 t - \omega_2 t)]$$

In the function expression of S12, the variable $\omega_1$ denotes the angular frequency of S1, the variable $\omega_2$ denotes the angular frequency of S2, and the variable t denotes the time slice. As shown in FIG. 3 and FIG. 4, combining S1 with S2 results in S12. S12 is not a smooth and well-proportioned mixed-wave, and does not have a uniform fixed-frequency and a uniform fixed-wavelength.

Figure 5:
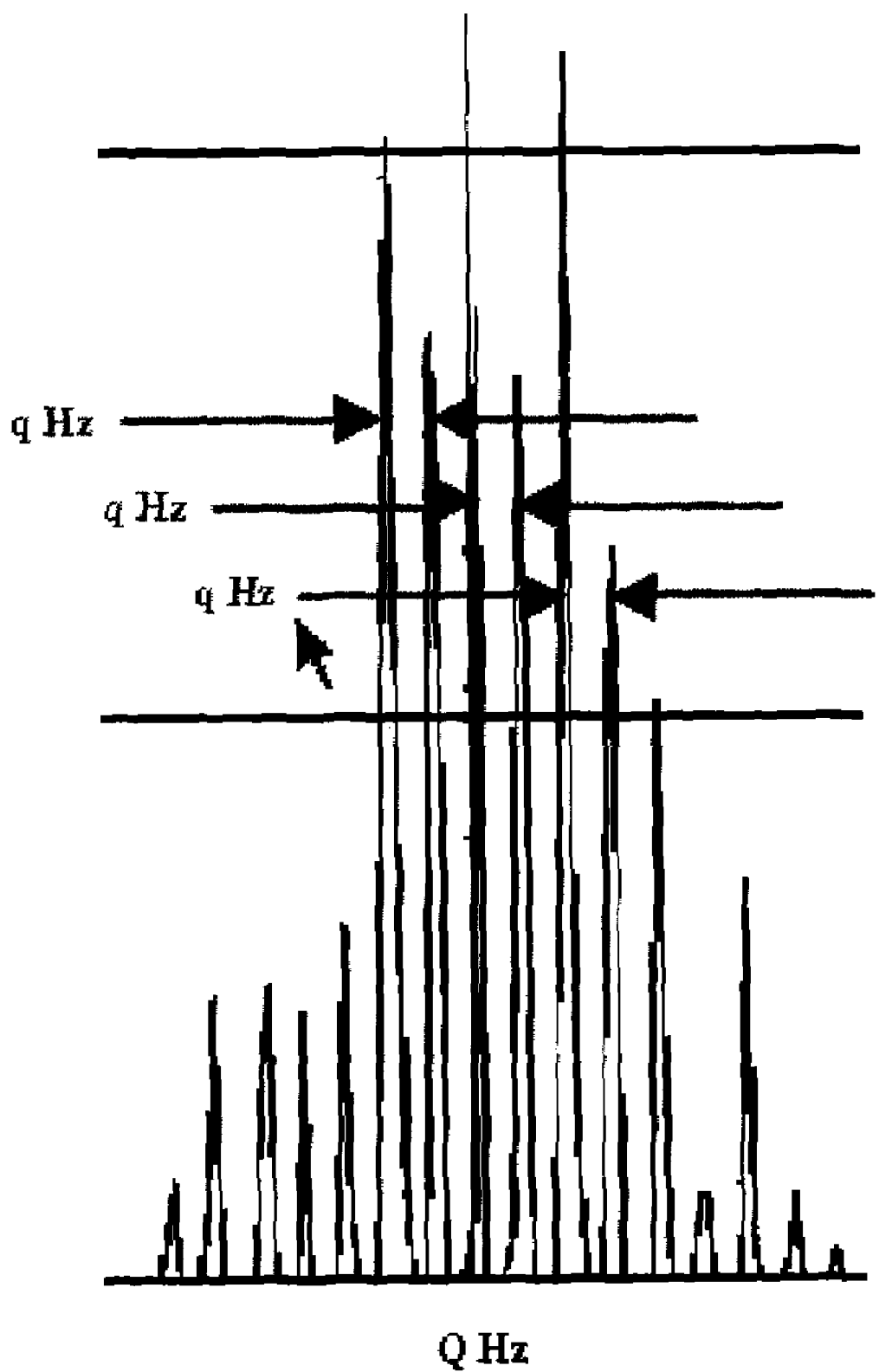
FIG. 5 is a schematic diagram illustrating how to compute the frequency of the low frequency wave of FIG. 2 by using wave analyzing software.

FIG. 5 is a schematic diagram illustrating how to compute the frequency of S1 of FIG. 2 by using the wave analyzing software. As shown in FIG. 4, there are many interference waves near the wave spectrum with a fixed-frequency Q hertz. The distance between any two adjacent interference waves is q, and q is the frequency of S1.

Figure 6:
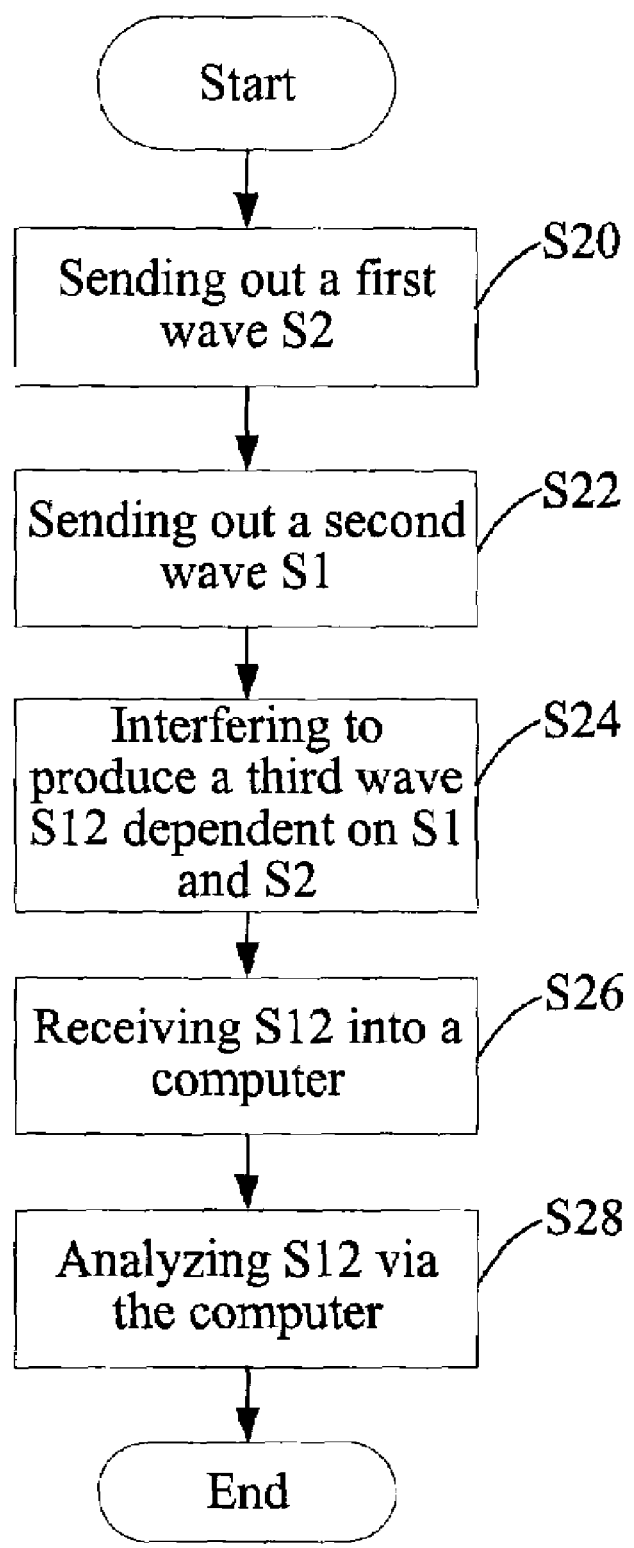
FIG. 6 is a flowchart of a method for computing the frequency of a low frequency wave in accordance with a preferred embodiment.

FIG. 6 is a flowchart of a method for computing the frequency of a low frequency sound wave in accordance with a preferred embodiment. When a user wants to compute the frequency of S1, he/she may link computer 1 with the speaker 3 and the microphone 2, and lays the speaker 3 and the sound wave output device 4 near the microphone 2, before computing the frequency of S1. In step S20, computer 1 controls the speaker 3 to send out the fixed-frequency sound wave named S2 that is the high frequency sound wave. The frequency of S2 can be any value ranged between 30 hertz and 20000 hertz. For example, the frequency of S2 can be 1600 hertz.

In step S22, the sound wave output device 4 sends out the fixed-frequency sound wave named S1 that is the low frequency sound wave. The frequency of S1 can be any value ranged between 0 hertz and 30 hertz. For example, the frequency of S1 can be 16 hertz.

In step S24, S1 and S2 are mixed together to generate an interference sound wave named S12 after the combining S1 and S2. A combined wave occurs when the sound wave combines with another sound wave or a vibration wave meet with another vibration wave.

In step S26, microphone 2 records and receives S12 into computer 1.

In step S28, computer 1 analyzes S12 (for example, the interference waves and the wave spectrum with a fixed-frequency Q hertz in FIG. 4) via the sound wave analyzing software so that the frequency of S1 is computed accordingly.

An alternative embodiment of the method can be used for computing the frequency of the low frequency vibration wave. In the alternative embodiment, firstly, two vibration wave generating devices (for example, car engine 6 and toy car engine 7 in FIG. 2) laid contiguously generate the high frequency vibration wave and the low frequency vibration wave correspondingly, the frequency combining between the two generated vibration waves resulting in the interference vibration wave being generated. Secondly, the vibration wave sensor (for example, vibration wave sensor 5 in FIG. 2) records and receives the interference vibration wave into computer 1. Thirdly, the computer 1 analyzes the interference vibration wave via the vibration wave analyzing software so that the frequency of the low frequency vibration wave is computed accordingly.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for computing the frequency of a low frequency wave, the system comprising:
    a wave producer being controlled by a computer to send out a first wave with a high frequency;
    a device configured for sending out a second wave with a low frequency which is to be computed, the first wave and the second wave interfering with each other thereby producing a third wave;
    a sensor configured for receiving the third wave; and
    the computer installed with wave analyzing software and linked with the sensor, and configured for receiving and analyzing the third wave in order to compute the frequency of the second wave.

2. The system as claimed in claim 1, wherein the wave producer sends out the first wave independently.

3. The system as claimed in claim 1, wherein the first wave and the second wave are both sound waves.

4. The system as claimed in claim 1, wherein the first wave and the second wave are both vibration waves.

5. The system as claimed in claim 1, wherein the wave producer and the device sending out the second wave are laid contiguously.

6. A method for computing the frequency of a low frequency wave, the method comprising the steps of:
    sending out a first wave with a high frequency via a wave producer being controlled by a computer;
    sending out from a device a second wave with a low frequency which is to be computed;
    interfering to produce a third wave dependent on the first wave and the second wave;
    receiving the third wave via a sensor; and
    analyzing the third wave in order to compute the frequency of the second wave via the computer that is installed with wave analyzing software.

7. The method as claimed in claim 6, wherein the wave producer sends out the first wave independently.

8. The method as claimed in claim 6, wherein the first wave and the second wave are both sound waves.

9. The method as claimed in claim 6, wherein the first wave and the second wave are both vibration waves.

10. The method as claimed in claim 6, wherein the wave producer and the device which sends out the second wave are laid contiguously.

11. A computer-enabled method for computing the frequency of a low frequency wave, the method comprising the steps of:
   sending out a first wave with a high frequency via a wave producer being controlled by a computer;
   sending out a second wave with a low frequency, the first wave and the second wave being both vibration waves;
   interfering to produce a third wave dependent on the first wave and the second wave;
   receiving the third wave from a sensor; and
   computing the frequency of the second wave by analyzing the third wave via the computer.

12. The method as claimed in claim 11, wherein the first wave and the second wave are both sound waves.

\* \* \* \* \*